(12) United States Patent  (10) Patent No.: US 7,755,900 B2
Cheng  (45) Date of Patent: Jul. 13, 2010

(54) HEAT DISSIPATING MODULE

(75) Inventor: Hsueh-Lung Cheng, Taipei (TW)

(73) Assignee: AMA Precision Inc., Taipei (TW)

( * ) Notice: Subject to any disclaimer, the term of this patent is extended or adjusted under 35 U.S.C. 154(b) by 71 days.

(21) Appl. No.: 12/273,496

(22) Filed: Nov. 18, 2008

(65) Prior Publication Data

US 2009/0141454 A1 Jun. 4, 2009

(30) Foreign Application Priority Data

Nov. 30, 2007 (TW) .............................. 96145765 A

(51) Int. Cl.
  *H05K 7/20* (2006.01)
  *G06F 1/20* (2006.01)
(52) U.S. Cl. .................. 361/710; 361/709; 361/720; 361/700; 361/719; 361/679.52; 165/86; 165/104.33
(58) Field of Classification Search ............ 361/679.52, 361/709, 710, 720, 700, 719; 165/86, 104.33
  See application file for complete search history.

(56) References Cited

U.S. PATENT DOCUMENTS

| 5,960,865 | A | * | 10/1999 | Costa et al. ................... 165/86 |
| 5,975,195 | A | * | 11/1999 | Lowry et al. ................... 165/86 |
| 6,125,035 | A | * | 9/2000 | Hood, III et al. ........ 361/679.47 |
| 6,141,216 | A | * | 10/2000 | Holung et al. .......... 361/679.52 |
| 6,175,493 | B1 | * | 1/2001 | Gold ..................... 361/679.47 |
| 6,226,178 | B1 | * | 5/2001 | Broder et al. .......... 361/679.52 |
| 6,359,780 | B1 | * | 3/2002 | McMahan et al. ...... 361/679.47 |
| 6,708,754 | B2 | * | 3/2004 | Wei .............................. 165/46 |
| 6,937,474 | B2 | * | 8/2005 | Lee ............................. 361/715 |
| 7,327,576 | B2 | * | 2/2008 | Lee et al. ..................... 361/719 |
| 7,411,791 | B2 | * | 8/2008 | Chang et al. ................. 361/703 |
| 7,515,423 | B2 | * | 4/2009 | Peng et al. ................... 361/710 |
| 2003/0189815 | A1 | * | 10/2003 | Lee ............................. 361/719 |
| 2004/0080908 | A1 | * | 4/2004 | Wang et al. ................. 361/687 |
| 2004/0114329 | A1 | * | 6/2004 | Shih-Tsung ................. 361/704 |
| 2006/0171113 | A1 | * | 8/2006 | Wu ............................. 361/687 |
| 2007/0006997 | A1 | * | 1/2007 | Hsieh ..................... 165/104.33 |
| 2007/0008702 | A1 | * | 1/2007 | Chang et al. ................. 361/704 |
| 2007/0171616 | A1 | * | 7/2007 | Peng et al. ................... 361/700 |
| 2008/0192427 | A1 | * | 8/2008 | Wu et al. ..................... 361/687 |

FOREIGN PATENT DOCUMENTS

EP  1742262 A3 * 7/2008

* cited by examiner

*Primary Examiner*—Anatoly Vortman
(74) *Attorney, Agent, or Firm*—Jianq Chyun IP Office

(57) ABSTRACT

A heat dissipating module including a first heat sink, a second heat sink, a connector, a pivot and a heat pipe is provided. The first heat sink is disposed on a circuit board and contacts a heat source. The second heat sink has a first pivotal hole and a limiting opening. The connector has a first connecting portion and a second connecting portion. The first connecting portion is fixedly connected to the first heat sink. The second connecting portion has a limiting protrusion and a second pivotal hole corresponding to the first pivotal hole. The pivot passes through the first pivotal hole and the second pivotal hole and is pivotally connected to the connector and the second heat sink. The limiting protrusion protrudes into the limiting opening to limit the rotation angle of the second heat sink relative to the connector.

11 Claims, 3 Drawing Sheets

HEAT DISSIPATING MODULE

CROSS-REFERENCE TO RELATED APPLICATION

This application claims the priority benefit of Taiwan application serial no. 96145765, filed on Nov. 30, 2007. The entirety of the above-mentioned patent application is hereby incorporated by reference herein and made a part of this specification.

BACKGROUND OF THE INVENTION

1. Field of the Invention

The invention relates to a heat dissipating module and, more particularly, to a heat dissipating module having a pivot.

2. Description of the Related Art

With the development of computer technology, the operation speed of a computer increases continually, and then heat generating power of electronic components inside a main body of the computer also increases. To prevent overheating of the electronic components inside the computer main body, which may cause the electronic components to degrade performance temporary or permanently, enough heat dissipating efficiency should be provided for the electronic components inside the computer. Therefore, a heat dissipating module is usually additionally assembled at the electronic components with high heat generating power to reduce the temperature of the electronic components.

A conventional heat dissipating module uses the combination of various kinds of heat sinks and heat dissipating fans, and they are fixed on the electronic components which generate heat by a binding adhesive, such as heat dissipating glue, bolted connection, or one of other ways. However, when the heat dissipating fans operate at high speed, they usually generate noise and vibration, and dust may accumulate on the heat dissipating fans to reduce the heat dissipating efficiency of the heat dissipating fans. To increase the heat dissipating efficiency and reduce the noise generated by the heat dissipating fans, the conventional heat dissipating module achieves the heat dissipating effect using a heat pipe cooperating with heat dissipating fins.

The heat dissipating module often achieves the heat dissipating effect using heat dissipating fin with a heat pipe. However, since the length and bending angle of the heat pipe are usually fixed, the distances between the heat dissipating module and other surrounding components or the computer housing need to be considered to avoid the interference with structure of the device. This may lead to the limitation in the design mode of the heat dissipating module and affect the heat dissipating effect.

BRIEF SUMMARY OF THE INVENTION

The invention provides a heat dissipating module having a larger heat dissipating area and able to provide good heat dissipating effect and preferable rotational position.

The invention provides a heat dissipating module adapted for dissipating heat generated by a heat source on a circuit board. The heat dissipating module includes a first heat sink, a second heat sink, a connector, a pivot and a heat pipe. The first heat sink is disposed on the circuit board and contacts the heat source. The second heat sink has a first pivotal hole and a limiting opening. The connector has a first connecting portion and a second connecting portion. The first connecting portion is fixedly connected to the first heat sink, and the second connecting portion has a limiting protrusion and a second pivotal hole corresponding to the first pivotal hole. The pivot passes through the first pivotal hole and the second pivotal hole, and it may be pivotally connected to the connector and the second heat sink. The limiting protrusion protrudes into the limiting opening and limits the rotation angle of the second heat sink when the second heat sink is rotated relative to the connector. The heat pipe has a first section and a second section connected to each other. The first section and the second section are inserted into the first heat sink and the second heat sink, respectively.

In an embodiment of the invention, the pivot includes a bolt and a nut. The two ends of the bolt have a block portion and a threaded portion, respectively. After the bolt passes through the first pivotal hole and the second pivotal hole, the block portion and the threaded portion are located at the two sides of the connector and the second heat sink, respectively. The nut is screwed to the threaded portion to limit the positions of the connector and the second heat sink between the block portion and the nut. In addition, the pivot may further include at least a washer sleeved on the bolt and located between the connector and the second heat sink. Furthermore, the pivot may further include at least a washer sleeved on the bolt and located between the nut and the second heat sink. The pivot may further include at least an oil seal washer sleeved on the bolt and located between the nut and the second heat sink. The oil seal washer has multiple through holes for accommodating lubricating oil.

In an embodiment of the invention, the first section of the heat pipe and the pivot are disposed coaxially.

In an embodiment of the invention, the first section and the second section of the heat pipe are perpendicular to each other.

In an embodiment of the invention, the second heat sink includes a supporting bracket and a heat dissipating fin assembly. The supporting bracket has a first pivotal hole and a limiting opening. The heat dissipating fin assembly is disposed on the supporting bracket.

In an embodiment of the invention, the first section of the heat pipe passes through space above the heat source.

In an embodiment of the invention, the limiting opening is arc-shaped.

In an embodiment of the invention, the heat dissipating module further includes a protecting cover disposed on the second heat sink and covering the protrusion portion of the pivot protruding from the first pivotal hole.

In an embodiment of the invention, since the first heat sink and the second heat sink are provided, the heat generated by the heat source can be dissipated by the larger heat dissipating area. In addition, when the heat dissipating module in the invention is assembled, the second heat sink is rotated relative to the first heat sink. Thus, the second heat sink and other components or the housing do not interfere with each other.

Therefore, the heat dissipating modules in the invention may be flexibly assembled in electronic devices with different sizes. Thus, the heat dissipating module does not need to be custom-made to accommodate different electronic device, and therefore, the cost of the heat dissipating module is reduced. In addition, in the heat dissipating module of the invention, since the limiting protrusion moves in the limiting opening with the cooperation of close assembly, preferable rotational position is achieved.

These and other features, aspects and advantages of the present invention will become better understood with regard to the following description, appended claims, and accompanying drawings.

DETAILED DESCRIPTION OF THE EMBODIMENTS

Figure 1:
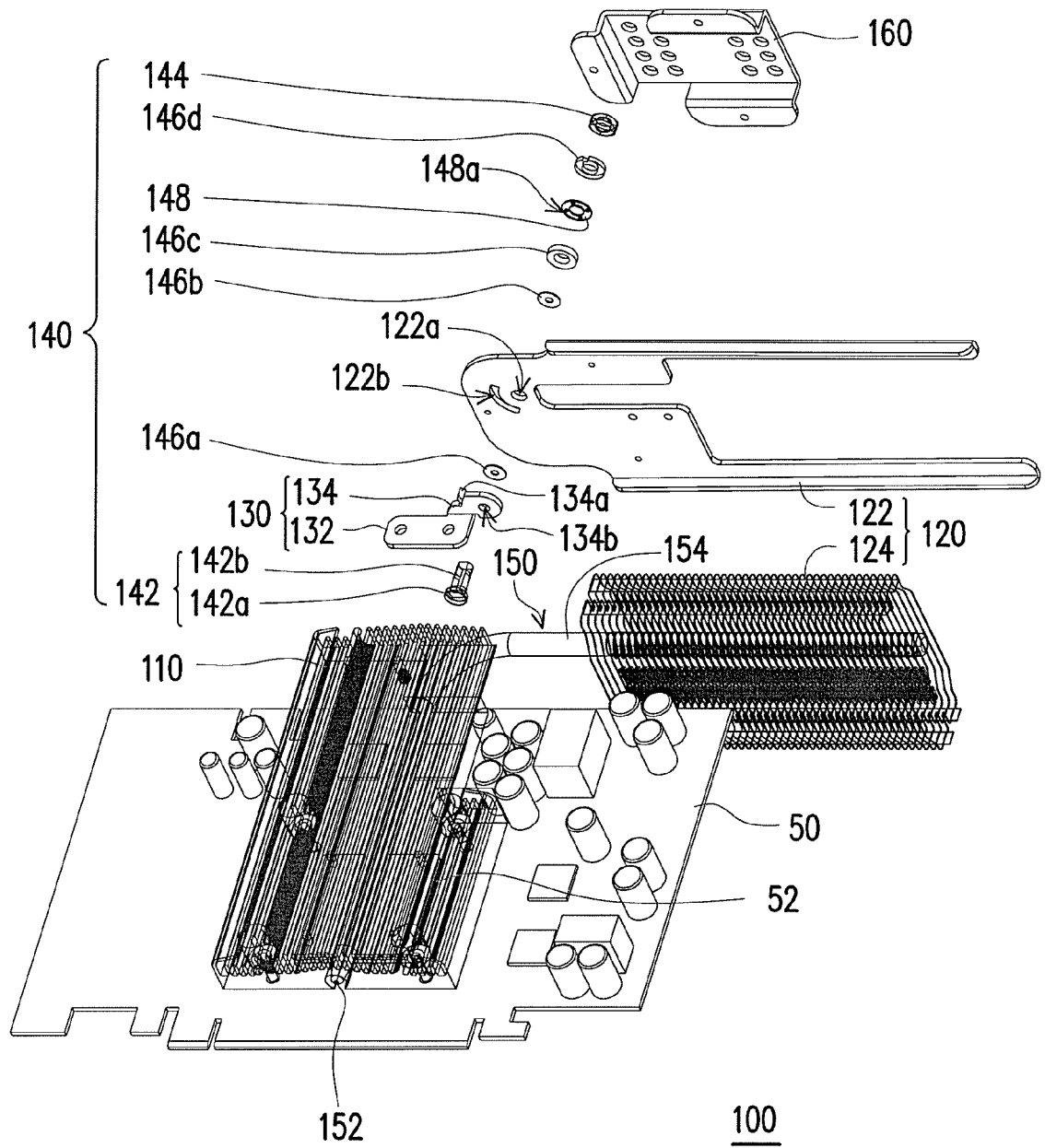
FIG. 1 is an exploded diagram showing a heat dissipating module relative to a circuit board in an embodiment of the invention.

FIG. 1 is an exploded diagram showing a heat dissipating module relative to a circuit board in an embodiment of the invention. As shown in FIG. 1, the heat dissipating module 100 is adapted for dissipating heat generated by a heat source 52 on a circuit board 50. The heat source 52 is, for example, an image processing chip or other electronic components operating at high temperature. The heat dissipating module 100 includes a first heat sink 110, a second heat sink 120, a connector 130, a pivot 140 and a heat pipe 150. The first heat sink 110 is disposed on the circuit board 50 and contacts the heat source 52 to conduct the heat generated by the heat source 52 to the first heat sink 110 and dissipate the heat. The second heat sink 120 has a first pivotal hole 122a and a limiting opening 122b. The connector 130 has a first connecting portion 132 and a second connecting portion 134. The first connecting portion 132 is fixedly connected to the first heat sink 110, and it may be fixed using a screw or one of other proper designs. The second connecting portion 134 has a limiting protrusion 134a and a second pivotal hole 134b corresponding to the first pivotal hole 122a.

The pivot 140 passes through the first pivotal hole 122a and the second pivotal hole 134b and is pivotally connected to the connector 130 and the second heat sink 120. That is, the connector 130 may be rotated relative to the second heat sink 120. The limiting protrusion 134a protrudes and moves in the limiting opening 122b to limit the rotation angle of the second heat sink 120 when the second heat sink 120 is rotated relative to the connector 130. The heat pipe 150 has a first section 152 and a second section 154 connected to each other. The first section 152 and the second section 154 are inserted into the first heat sink 110 and the second heat sink 120, respectively, to conduct the heat generated by the heat source 52 to the second heat sink 120 through the first heat sink 110 and the heat pipe 150.

Figure 2A:
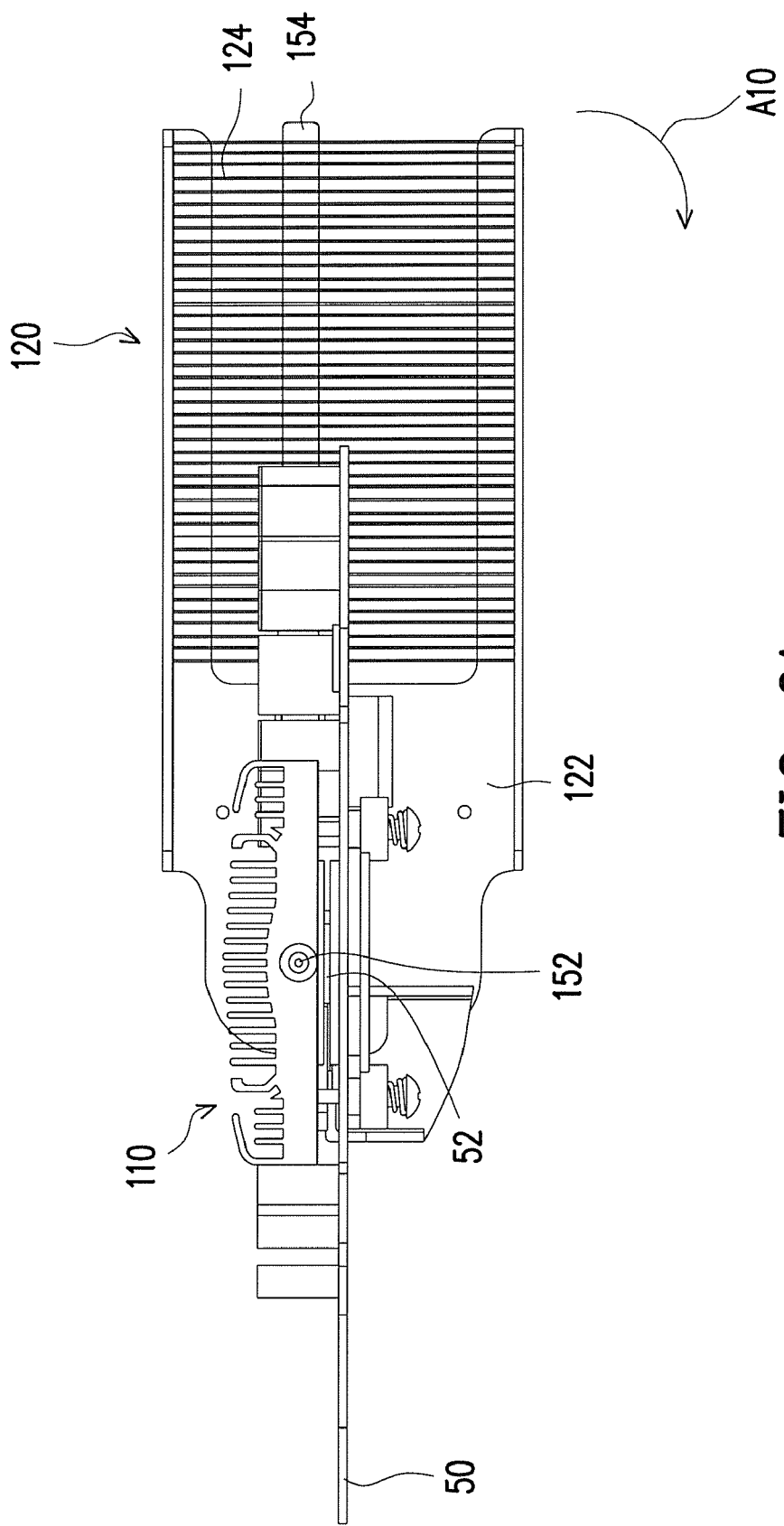
FIG. 2A is a side view showing that the heat dissipating module in FIG. 1 is assembled to the circuit board.
Figure 2B:
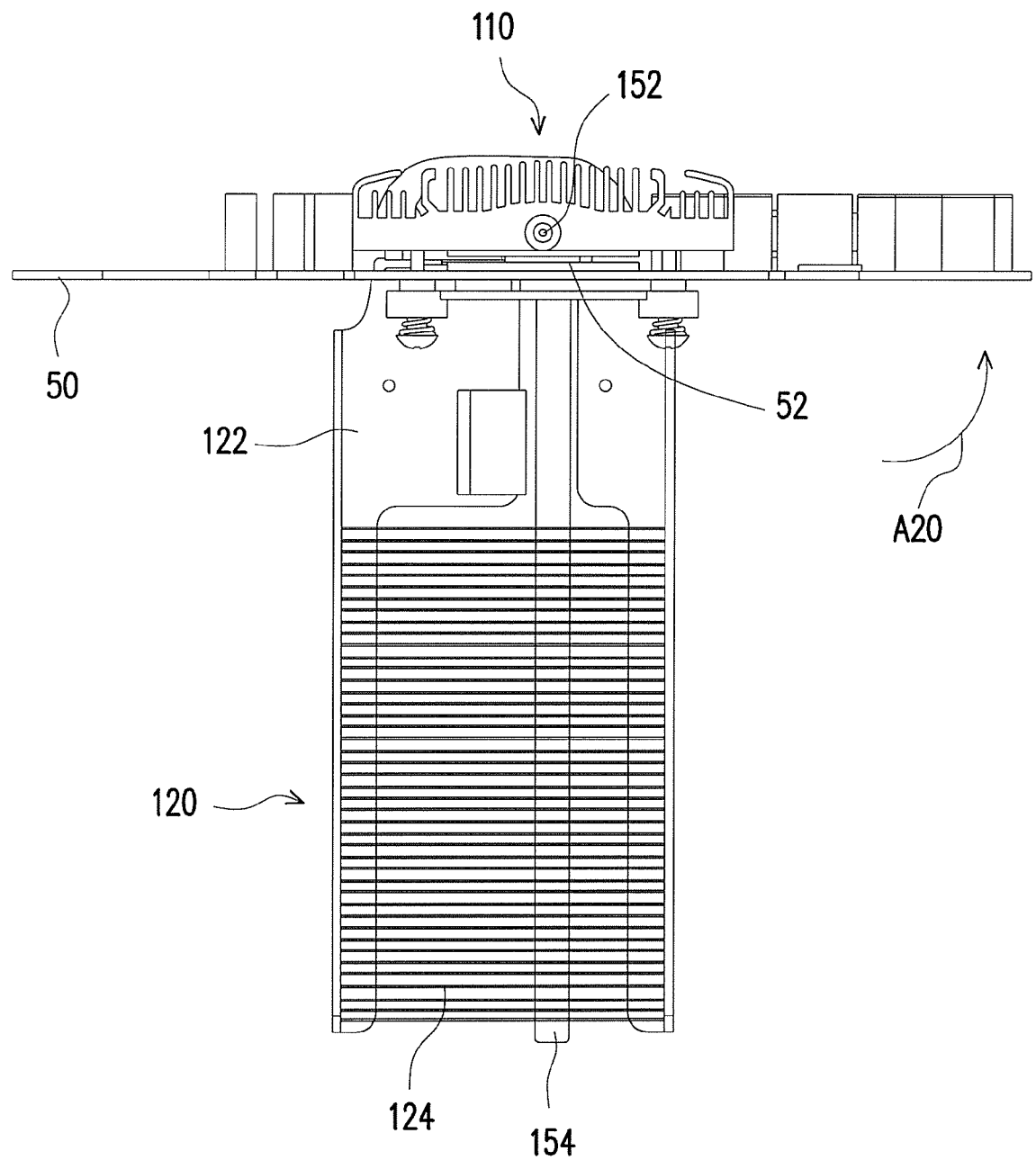
FIG. 2B is a side view showing the second heat sink in FIG. 2A after the second heat sink is rotated.

FIG. 2A is a side view showing that the heat dissipating module in FIG. 1 is assembled to the circuit board. FIG. 2B is a side view showing the second heat sink in FIG. 2A after the second sink is rotated. As shown in FIG. 2A, the second heat sink 120 may be rotated relative to the connector 130 along the direction showing by the arrow A10. Thus, the second heat sink 120 may be rotated when necessary. This avoids the interference of the second heat sink 120 with other components of the structure of the device. FIG. 2B shows the state of the second heat sink 120 after the second heat sink 120 is rotated. The second heat sink 120 also may be rotated relative to the connector 130 along the arrow A20 shown in FIG. 2B to go back to the state shown in FIG. 2A.

In the embodiment, the heat generated by the heat source 52 may be dissipated by the first heat sink 110, and it also may be conducted to the second heat sink 120 through the heat pipe 150 and dissipated. Thus, the heat dissipating area is enlarged effectively, and the heat dissipating efficiency increases. In addition, when the heat dissipating module 100 is assembled, the second heat sink 120 may be rotated relative to the first heat sink 110 to allow the second heat sink 120 and other components not to interfere with each other. Therefore, the heat dissipating module 100 in the embodiment may be flexibly assembled in various kinds of electronic components. Thus, the heat dissipating module 100 does not need to be custom-made according to different electronic components, and therefore, the cost of the heat dissipating module 100 is reduced.

In addition, the pivot 140 in the embodiment may include a bolt 142, a nut 144, at least a washer 146 and at least an oil seal washer 148. The two ends of the bolt 142 have a block portion 142a and a threaded portion 142b, respectively. After the bolt 142 passes through the first pivotal hole 122a and the second pivotal hole 134b, the block portion 142a and the threaded portion 142b are located at two sides of the connector 130 and the second heat sink 120. The nut 144 is screwed to the threaded portion 142b and the nut 144 and the block portion 142a of the bolt 142 interfere with the connector 130 and the second heat sink 120, respectively. Thus, the positions of the connector 130 and the second heat sink 120 are limited between the block portion 142a and the nut 144.

In the embodiment, the washer 146 includes at least one of a washer 146a, a washer 146b, a washer 146c and a washer 146d or their combination. The washer 146a is sleeved on the bolt 142 and located between the connector 130 and the second heat sink 120. In addition, the washer 146b, the washer 146c and the washer 146d are sleeved on the bolt 142 and located between the nut 144 and the second heat sink 120. The oil seal washer 148 is sleeved on the bolt 142 and located between the nut 144 and the second heat sink 120. The oil seal washer 148 has multiple through holes 148a for accommodating lubricating oil to make the second heat sink 120 rotate relative to the first heat sink 110 smoothly.

In the embodiment, the first section 152 of the heat pipe 150 and the pivot 140 are disposed coaxially. That is, the first section 152 of the heat pipe 150 and the axis of the pivot 140 are on the same axis. The first section 152 of the heat pipe 150 and the second section 154 may be perpendicular to each other. The first section 152 of the heat pipe 150 passes through space above the heat source 52 to get close to the heat source 52 as near as possible and quickly conduct the heat to the second heat sink 120 and dissipate the heat. In addition, the second heat sink 120 may include a supporting bracket 122 and a heat dissipating fin assembly 124. The supporting bracket 122 has a first pivotal hole 122a and a limiting opening 122b, and the heat dissipating fin assembly 124 may be disposed on the supporting bracket 122. The second heat sink 120 in the embodiment is divided into a supporting bracket 122 and a heat dissipating fin assembly 124 to facilitate the assembly. However, the second heat sink 120 may adopt one of other designs to facilitate the assembly, and they are not illustrated herein.

In addition, the limiting opening 122b may be arc-shaped to allow the limiting protrusion 134a to move smoothly along the arc-shaped limiting opening 122b. The arc length of the limiting opening 122b determines the rotation angle of the second heat sink 120 when the second heat sink 120 is rotated relative to the connector 130. In addition, to allow the second heat sink 120 to be fixed at different rotation angles when the second heat sink 120 is rotated relative to the connector 130, the second connecting portion 134, the washer 146a, the supporting bracket 122, the washer 146b and other components located between the block portion 142a and the nut 144 are closely assembled. Thus, a user may make a fine adjustment to the rotation angle of the second heat sink 120 according to the space in the housing and other conditions to achieve a preferred effect of controlling the rotation angle.

In addition, the heat dissipating module 100 may further include a protecting cover 160 which is disposed on the second heat sink 120 and covers the protrusion portion of the pivot 140 protruding from the first pivotal hole 122a. The protecting cover 160 may prevent the protrusion portion of the pivot 140 protruding from the first pivotal hole 122a from abrading other components, and it also may avoid that the user touches the nut 144 by accident and loosens the bolt 142 from the nut 144.

To sum up, the heat dissipating module in the embodiment of the invention has at least the following advantages.

First, the heat dissipating module may dissipate heat generated by the heat source by the first heat sink and the second heat sink. Thus, the heat dissipating area increases, and the heat dissipating efficiency increases.

Second, when the heat dissipating module of the invention is assembled, the second heat sink may be rotated to prevent the second heat sink from interfering with other components of the structure of the device. Therefore, the heat dissipating modules can be flexibly assembled in different electronic components. Thus, the heat dissipating module does not need to be custom-made according to different electronic devices, and therefore, the manufacturing cost of the heat dissipating module is reduced.

Third, in the heat dissipating module of the invention, since the limiting protrusion moves in the limiting opening, preferable rotational position is achieved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A heat dissipating module adapted for dissipating heat generated by a heat source on a circuit board, the heat dissipating module comprising:
   a first heat sink disposed on the circuit board and contacting the heat source;
   a second heat sink having a first pivotal hole and a limiting opening;
   a connector having a first connecting portion and a second connecting portion, wherein the first connecting portion is fixedly connected to the first heat sink, and the second connecting portion has a limiting protrusion and a second pivotal hole corresponding to the first pivotal hole;
   a pivot passing through the first pivotal hole and the second pivotal hole to be pivotally connected to the connector and the second heat sink, wherein the limiting protrusion protrudes and moves in the limiting opening to limit the rotation angle of the second heat sink when the second heat sink is rotated relative to the connector; and
   a heat pipe having a first section and a second section, wherein the first section and the second section are inserted into the first heat sink and the second heat sink, respectively.

2. The heat dissipating module according to claim 1, wherein the pivot comprises:
   a bolt having a block portion and a threaded portion at the two ends, respectively, wherein after the bolt passes through the first pivotal hole and the second pivotal hole, the block portion and the threaded portion are located at two sides of the connector and the second heat sink, respectively; and
   a nut screwed to the threaded portion and limiting the positions of the connector and the second heat sink between the block portion and the nut.

3. The heat dissipating module according to claim 2, wherein the pivot further comprises at least a washer sleeved on the bolt and located between the connector and the second heat sink.

4. The heat dissipating module according to claim 2, wherein the pivot further comprises at least a washer sleeved on the bolt and located between the nut and the second heat sink.

5. The heat dissipating module according to claim 2, wherein the pivot further comprises at least an oil seal washer sleeved on the bolt and located between the nut and the second heat sink, and the oil seal washer has multiple through holes for accommodating lubricating oil.

6. The heat dissipating module according to claim 1, wherein the first section of the heat pipe and the pivot are disposed coaxially.

7. The heat dissipating module according to claim 1, wherein the first section and the second section of the heat pipe are perpendicular to each other.

8. The heat dissipating module according to claim 1, wherein the second heat sink comprises:
   a supporting bracket having the first pivotal hole and the limiting opening; and
   a heat dissipating fin assembly disposed on the supporting bracket.

9. The heat dissipating module according to claim 1, wherein the first section of the heat pipe passes through space above the heat source.

10. The heat dissipating module according to claim 1, wherein the limiting opening is arch-shaped.

11. The heat dissipating module according to claim 1, further comprising a protecting cover disposed on the second heat sink and covering a protrusion portion of the pivot protruding from the first pivotal hole.

* * * * *